United States Patent
Venkatesh et al.

(10) Patent No.: US 11,429,576 B2
(45) Date of Patent: Aug. 30, 2022

(54) METHODS AND SYSTEMS FOR GARBAGE DELETION IN A DOCUMENT DATABASE

(71) Applicant: Macrometa Corporation, Palo Alto, CA (US)

(72) Inventors: Chetan Venkatesh, Belmont, CA (US); Durga Gokina, San Jose, CA (US)

(73) Assignee: Macrometa Corporation, Palo Alto, CA (US)

( * ) Notice: Subject to any disclaimer, the term of this patent is extended or adjusted under 35 U.S.C. 154(b) by 114 days.

(21) Appl. No.: 16/935,839

(22) Filed: Jul. 22, 2020

(65) Prior Publication Data

US 2021/0064590 A1    Mar. 4, 2021

Related U.S. Application Data

(60) Provisional application No. 62/877,739, filed on Jul. 23, 2019.

(51) Int. Cl.
*G06F 16/00*     (2019.01)
*G06F 16/215*    (2019.01)
*G06F 16/27*     (2019.01)
*G06F 16/93*     (2019.01)
*G06F 16/23*     (2019.01)

(52) U.S. Cl.
CPC ........ *G06F 16/215* (2019.01); *G06F 16/2315* (2019.01); *G06F 16/273* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 5,649,185 | A | * | 7/1997 | Antognini ............... G06F 16/10 726/2 |
| 2017/0286476 | A1 | * | 10/2017 | Vosshall ............... G06F 16/219 |
| 2020/0327116 | A1 | * | 10/2020 | Perlick .................. G06F 40/131 |

OTHER PUBLICATIONS

Guy Harrison, "Yet Another Database Blog—Vector clocks", Oct. 12, 2015, 4 Pages. (Year: 2015).*
Ricky Ho, "Pragmatic Programming Techniques: NOSQL Patterns", Nov. 2009, 12 Pages. (Year: 2009).*
Priya Rajagopal, "Demystifying Conflict Resolution in Couchbase Mobile", May 25, 2017, 15 Pages. (Year: 2017).*
International Search Report and Written Opinion of the ISA in PCT/US2020/043235; dated Oct. 16, 2020; 8 pgs.

(Continued)

*Primary Examiner* — Bai D Vu
(74) *Attorney, Agent, or Firm* — Goodwin Procter LLP

(57) ABSTRACT

Disclosed herein are exemplary systems and methods for garbage collection and/or deletion in a document database. The methods may include, for each change in a first change set, determining whether a first characteristic of the change is superseded by a second characteristic of a corresponding change in a second change set. The change of the first change set and the change of the second change set can pertain to a document attribute. The method may include determining whether the first change set is redundant with the second change set if each change of the first change set is superseded by a corresponding change of the second change set, and eliminating the first change set from the document database when the first change set is redundant with second change set.

13 Claims, 7 Drawing Sheets

(56) References Cited

OTHER PUBLICATIONS

Harrison. Vector Clocks, 2015 [online], [retrieved on Sep. 12, 2020]. Retrieved from the Internet <URL:http://guyharrison.squarespace.com/blog/2015/10/12/vecotor-clocks.html>, pp. 1-6.

Ho. Pragmatic Programming Techniques: NOSQL Patterns, 2009. [online], [retrieved on Sep. 12, 2020]. Retrieved from the Internet <URL:http://horicky.blogspot.com/2009/11/nosql-patterns.html>, pp. 1-14.

Rajagopal. Demystifying Conflict Resolution in Couchbase Mobile, The Couchbase Blog, 2017, [online], [retrieved on Sep. 12, 2020]. Retrieved from the Internet <URL:https//blog.couchbase.com/conflict-resolution-couchbase-mobile/>, pp. 1-15.

* cited by examiner

METHODS AND SYSTEMS FOR GARBAGE DELETION IN A DOCUMENT DATABASE

CROSS-REFERENCE TO RELATED APPLICATIONS

This application claims priority to and benefit of U.S. Provisional Patent Application No. 62/877,739, entitled "METHOD AND SYSTEM FOR GARBAGE DELETION IN A DOCUMENT DATABASE," filed on Jul. 23, 2019, the entire contents of which are incorporated herein by reference.

FIELD

The present disclosure is related to the field of database management, and, more particularly, is related to the field of garbage collection in a document database.

BACKGROUND

Modern web and mobile applications are becoming increasingly concerned with providing low-latency, global operation at scale. To provide low-latency operations, applications typically need to be deployed in multiple data centers (DCs) with user data replicated to each of these DCs, allowing user requests to be serviced by the nearest geographic DC. However, while reducing user perceived latency through the replication of data, application developers are now faced with an additional, even more difficult challenge: managing the consistency of multiple replicas.

First-generation content delivery networks (CDNs) reduce user perceived latency when performing read operations against shared data. Each data item in the system is designated with a primary site where all data modifications occur and read-only replicas are maintained at every other site. These replicas are periodically refreshed on demand and cache eviction messages are used to expire the data stored at remote replicas. Updates are totally ordered by the primary site; in that every replica in the system sees the same updates in the same order. Therefore, users observe eventual consistency; writes are performed at the designated primary replica and reads at other DCs eventually return the result of the most recent write. While CDNs work well for a read-dominated workload, they fail to assist the developer in situations where the workload may be write-dominated.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Systems and methods for garbage collection and/or deletion in a document database are disclosed.

In one aspect, disclosed herein is a system for garbage deletion in a document database. The exemplary system can include at least one memory for storing computer-executable instructions; and at least one processor for executing the instructions stored on the memory. The execution of the instructions programs the at least one processor to perform operations including, for each change in a first change set, comparing a first characteristic of the change to a second characteristic of a corresponding change in a second change set. The change of the first change set and the change of the second change set can pertain to an attribute of a document in the document database. Further, the operations include, for each change in the first change set, determining whether the change of the first change set is superseded by the change of the second change set based on the comparison of the first characteristic to the second characteristic. The operations can include determining whether the first change set is redundant with the second change set if each change of the first change set is superseded by a corresponding change of the second change set; and eliminating the first change set from the document database when the first change set is redundant with second change set.

In another aspect, disclosed herein is a method for garbage deletion in a document database. The method can include for each change in a first change set, comparing a first characteristic of the change to a second characteristic of a corresponding change in a second change set. The change of the first change set and the change of the second change set can pertain to an attribute of a document in the document database. Further, the method include, for each change in the first change set, determining whether the change of the first change set is superseded by the change of the second change set based on the comparison of the first characteristic to the second characteristic. The method can include determining whether the first change set is redundant with the second change set if each change of the first change set is superseded by a corresponding change of the second change set; and eliminating the first change set from the document database when the first change set is redundant with second change set.

In yet another aspect, disclosed herein is a non-transitory computer-readable medium having instructions stored thereon that, when executed by one or more computer processors, cause the computer processors to perform operations including, for each change in a first change set, comparing a first characteristic of the change to a second characteristic of a corresponding change in a second change set. The change of the first change set and the change of the second change set can pertain to an attribute of a document in the document database. Further, the operations include, for each change in the first change set, determining whether the change of the first change set is superseded by the change of the second change set based on the comparison of the first characteristic to the second characteristic. The operations can include determining whether the first change set is redundant with the second change set if each change of the first change set is superseded by a corresponding change of the second change set; and eliminating the first change set from the document database when the first change set is redundant with second change set.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
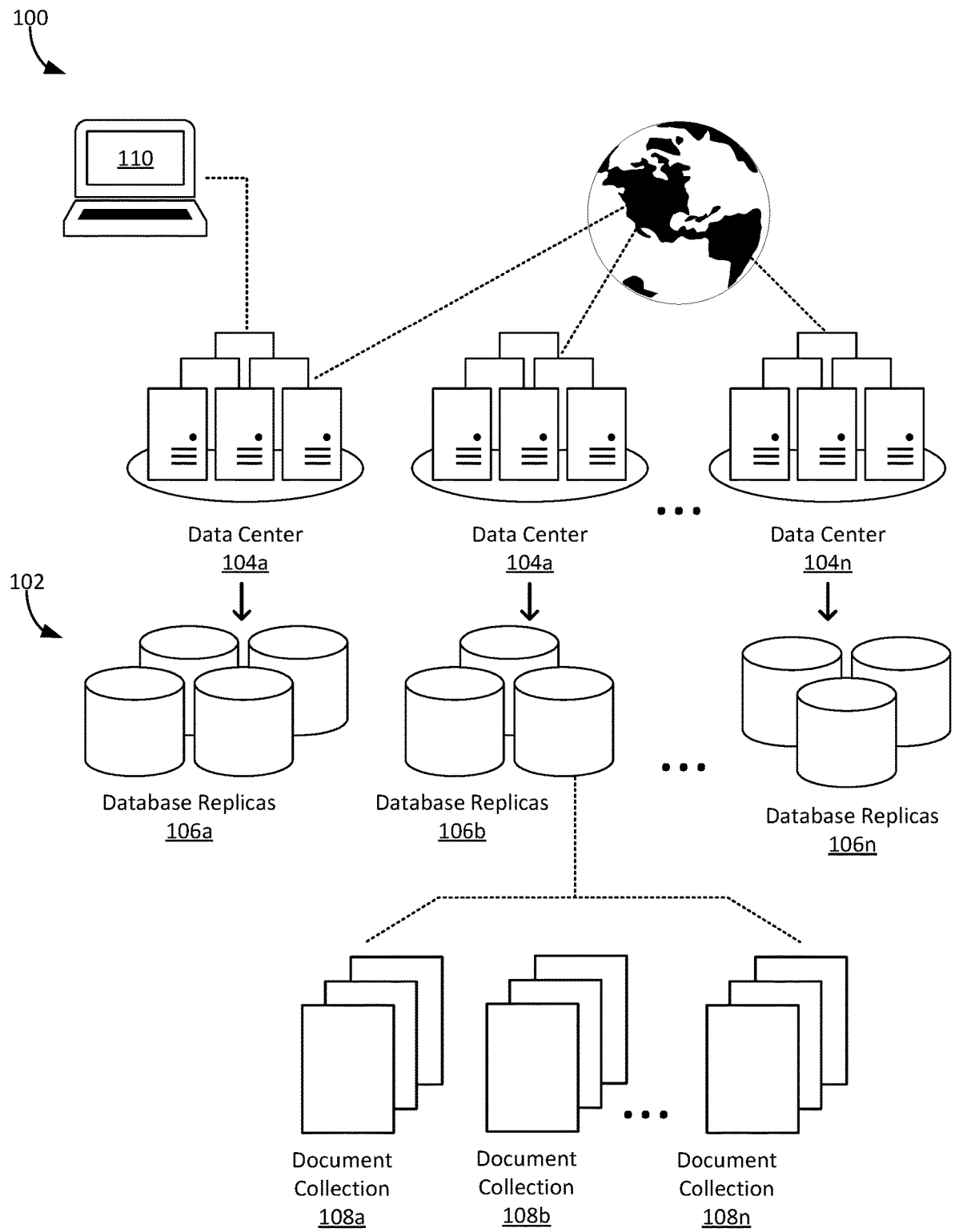
FIG. 1 is a diagram illustrating an exemplary document database system and related network.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Described herein are exemplary systems and methods for garbage collection and/or deletion in document databases.

Managing Replicated Data

As discussed, reduction of user-perceived latency in accessing data deployed in multiple data centers (DCs) can be highly desirable. However, this leads to difficulties in managing the consistency among multiple replicas. To solve the issue of low-latency, write-dominated workloads, it can be beneficial for some, most, or all replicas to be able to accept and process writes on behalf of the user. However, handling writes at each DC can raise a number of difficult challenges. First, if all replicas in the system are expected to observe the same events in the same order, it is beneficial for the system to some form of coordination between replicas to obtain this order. In the case of geo-replication, this can be costly because (i) the geographic distance between replicas communicating with one another will slow down the system to the speed of the slowest link, and (ii) remote replicas may be unavailable due to network partitions between two remote DCs. Second, if the requirement for totally ordering all writes is forgone, concurrent writes for the same data item that occur at different DCs may conflict and the system will need to be configured to resolve these conflicting writes.

Conflict-free replicated data types (CRDTs) are one way of dealing with automatic conflict resolution. CRDTs can be of two types: state-based and operation-based. With state-based CRDTs, each CRDT is an abstract data type that is extended with a deterministic merge operation. When two changes are in conflict, the objects are merged using a predefined process for processing the merge. Operation-based CRDTs rely on two properties: (i) causal delivery of changes, which ensures that changes are delivered to remote replicas observing the causal order in which the changes occurred; and (ii) the commutativity of concurrent operations, which ensures that any changes that are concurrent with respect to the causal order will result in the same outcome. State-based CRDTs have seen significant adoption in industry, whereas operation-based CRDTs have not had as much success, presumably due to the lack of industrial support for causal delivery in modern programming frameworks. However, as not all types of applications can be modeled using CRDTs and causal consistency (e.g., registers with access controlled by a mutex, bank account transfer with non-negative balance invariant), for any solution to be comprehensive, it must offer strong consistency operations as well.

Described herein are exemplary systems that include a geo-replicated, conflict-free replicated document database. The exemplary document database can operate in two modes: (i) a single-master mode, in which the system provides strong consistency and serializable transactions; or (ii) a multi-master mode, in which the system provides session guarantees. Documents in the exemplary document database may be JavaScript Object Notation (JSON) documents that can contain sequences and/or dictionaries. These documents can reference other documents in the exemplary system. Modifications to documents may be modeled using operation-based CRDTs and conflicting changes may be automatically resolved by using a predefined merge process that depends on the type of modification and/or the type of document. Modifications to documents may be stored in a log and may be asynchronously propagated in causal order using reliable causal broadcast, thereby enabling users to observe session guarantees while connected to a single DC. Users may initiate reads and writes and may have the ability to perform atomic transactions. In multi-master mode, transactions may exhibit parallel snapshot isolation.

The exemplary document database may provide the following:
  i. Geo-replicated JSON document database that provides strong consistency (single-master) or session guarantees (multi-master);
  ii. Operation-based CRDT document model with garbage collection for automatic resolution of concurrent, conflicting changes; and/or
  iii. Transactions with serializable isolation (single-master) or parallel snapshot isolation (multi-master).

As used herein, "garbage collection" is a term of art referring to the reclamation of "garbage" or memory occupied by objects (e.g., data) that are not used in the program or database. By enabling garbage collection, the exemplary systems and methods described herein increase the efficiency of computing systems. For instance, the exemplary systems may free up memory that can be used for more important data, enable greater flexibility in the management of such databases, enable users with more efficient and/or faster computing and/or data storage services, and/or decrease the resources used in managing unused data in document databases. Further, garbage collection may enable a database to store more user data in a given storage unit, thereby leading to better utilization of storage unit. These advantages may be important in computing networks that rely on a significant number of data centers (which may be geographically distributed) to service its users. Therefore, the exemplary systems and methods described herein enable more efficient storage of data, thereby improving the functioning of computing systems.

FIG. 1 illustrates a network 100 including an exemplary document database system 102 and its relationship to other network components. The exemplary document database 102 is a key-value document storage system configured to operate in multiple DCs 104a, 104b, 104n (collectively referred to as 104) (e.g., tens of DCs, hundreds of DCs, etc.). Each DC 104 can replicate a set of databases (e.g., one or more databases 106a, 106b, 106n, collectively referred to as 106). Each database 106 may include one or more collections 108a, 108b, 108n (collectively referred to as 108) of documents. Documents may be accessed using a query language that can operate over collections and can enable users to read and/or write documents. Each document may be assigned a unique key. This key may be assigned by the system at the time of document creation.

A single metadata database may be used to replicate information regarding which databases (e.g., the identities thereof) are replicated by which DCs (e.g., the identities thereof). Within each DC, a cluster of nodes may be responsible for storage of each database. Cluster membership within the DC can be strongly consistent and can be managed by a service, e.g., Apache Zookeeper (provided by Apache Software Foundation, Forest Hill, Md., USA), according to one embodiment.

In some embodiments, databases are fully replicated. In some instances, not each DC replicates all databases. Therefore, the system can be partially replicated where each collection contains metadata regarding the DCs at which the collection should be replicated.

Databases may operate in one of two modes: (i) single-master, in which a single DC is responsible for processing read and/or write operations issued against the database and all other DCs (of the system) that replicate the database are passive (e.g., issue read operations but not write operations); or (ii) multi-master, in which every DC replicating the database is configured to accept and process read and/or write operations. Client devices 110 (referred to herein as clients) may be automatically connected to their nearest available DC (e.g., geographically nearest). Read and/or write operations may be automatically routed to the primary replica if the accessed database is a single-master database. Writes occurring within a single DC may be synchronous.

In a single-master database, reads and writes observe linearizability. Writes may written to the primary replica but may be asynchronously delivered to passive replicas. In a multi-master database, read and write operations may be processed at whichever replica receives the request. While clients remain connected to a single DC, the multi-master database may observe session consistency.

The exemplary database system can include of three components: global persistent streams, a document store, and a local persistent stream. Each component may be replicated for fault tolerance.

Global Persistent Streams. The first component is a set of global persistent streams that contains the unacknowledged changes for the remote DCs that replicate the same databases. There may be one stream per destination replica and/or per each collection. The exemplary system may be realized using Apache Bookkeeper (provided by Apache Software Foundation, Forest Hill, Md., USA). The exemplary system may use a pull-based model, where remote replicas subscribe to events in one or more of the streams and changes are pulled in first-in, first-out (FIFO) order, to the origin DC by the remote DC, according to one embodiment. When an update has been received by the remote DC, it may be processed, acknowledged, and removed from the stream, ensuring reliable delivery under failure.

Document Store. The second component is a document store, which may be realized using RocksDB (provided by Facebook, Inc., Menlo Park, Calif., USA). The document store can be used for storage of events and the materialized state related to each key in the collection. Each document, one for each key in the collection, may be made up of two components: (a) the event log, which can include some, most, or all of the events taken from the changes in the persistent streams related to this key; and (b) the materialized state, which is a materialized version of the events in the event log. In some embodiments, this materialized state may be an optimization, so readers do not need to wait for the document to be materialized from the event log for every read.

Local Persistent Stream. The third component is a local persistent stream that can include a real-time view of the changes occurring in the database. This system can be realized using Apache Bookkeeper. Each item is the materialized state resulting from local and/or incoming changes occurring at this replica and, in some instances, populated as the changes arrive.

Documents and Document Indexes

As described above, documents in the exemplary document database system can be formatted in the JSON format and may be aggregated into collections. According to one embodiment, the exemplary document database system supports two types of collections: (a) generic collections, in which any free-form JSON document can be stored in the system; and/or (b) edge collections.

Generic collections may store three types of documents: one primitive type and two recursive types. Registers may serve as a primitive type that can only be modified by assignment and may contain opaque values. Maps and sequences are recursive types; they may contain other maps, sequences, and/or base types by document reference or through value embedding. Maps are unordered dictionaries; sequences can be considered maps from array index to value. Document references are pointers to other keys in the store upon materialization. Document references may be recursively resolved to a final value in the materialized state.

Edge collections can be used for the storage of graph data. Edge collections may ensure that all stored JSON documents take a particular form. They can include a "from" field and a "to" field that specifies the source and destination vertices in the graph, respectively. Edges may be annotated with a free-form type, denoting the type of relation—labeled edges.

Document Indexes

The exemplary document database system supports one or more of the following types of indexes over documents:
1. Geo-location. If the document provides a field containing a latitude-longitude tuple, the tuple can be used to facilitate geo-queries.

2. Hash. The hash index can be used to index a document based on a specific field, if that field happens to be unique.
3. Persistent. Persistent indexes are durably stored hash indexes; instead of being recreated upon failure of a DC, they are stored durably on disk.
4. Full-text. Given a field to index, a Lucene-style full-text search index can be built across all documents in the collection.
5. Skip-list. The skip-list index indexes documents using a given field and provides support for efficient range queries.

In some embodiments, indexes are collocated on the same nodes as the documents that they are indexing. They can be stored alongside the documents in RocksDB and mutated along with the document in a transaction, thereby ensuring all-or-nothing behavior under failure.

Application Programming Interface (API)

Clients can interact with the exemplary document database system using a query language similar to structured query language (SQL) that operates over a JSON document, enabling clients to insert, change, and/or select documents. A document may be changed using its unique key assigned by the exemplary document database system.

Changes

Clients may interact with the exemplary document database system by issuing API commands against a replica of the system, e.g., the replica geographically nearest to the client's physical location. When an change operation is received for a document, the receiving DC computes a delta (representing the change) from the current materialized state to the new state generated by the client's operation. In some embodiments, this delta describes the difference between the current materialized state and the new state and may not contain the unmodified fields.

For example, the state for a map at DC1 starts with two keys: key x, which points to value 1, and key y, which points to value 2. When the user issues an operation to change key y to value 4 and to add the additional key z with value 3, an change is generated containing only the modified contents of the object. Therefore, the change does not contain the key x. This change generated from a user's change command is a delta.

Once a delta has been generated, the delta is then decomposed into a set of changes representing the change to each field. In the previous example, the change generated by the exemplary document database system for the map contained two keys, key y pointing to the value 4 and key z pointing to the value 3. The decomposition of this change creates two distinct changes, one for each key in the map, y and z. These decomposed changes can then be inserted into global persistent streams for each DC that is replicating the collection containing this key.

The set of changes placed in the global persistent streams can be represented by a set of decomposed delta changes and annotated with two logical clocks: (a) a logical clock representing the causal dependencies on which this change depends; and (b) a logical clock representing the unique identifier for this change.

These changes can then be subsequently applied to the event log for the document in the document store. As previously discussed, each key in the exemplary document database system has a document in the document store and this document contains both an event log and materialized state. The event log in each document is a collection of event logs for each field; in the case of the previously discussed map, there is a single event log for each field: x, y, and z. The exemplary document database system atomically inserts the events into the event log and changes the materialized state for each set of changes received. Finally, the materialized state is placed in the local persistent stream at the DC.

Replication and Consistency

As previously discussed, each DC provides streams of changes realized by persistent streams. If a remote DC is instructed to replicate a collection, it can subscribe to the streams of one, some, or all of the other remote DCs that are replicating that collection. Remote DCs can be configured to pull a single group of changes at a time (representing a single write to the exemplary document database system and annotated with a single logical clock) and apply those changes locally. The remote DC can remotely acknowledge that the change has been applied before moving to the next group of changes. Changes are kept in persistent streams until acknowledged by the remote DC or when a predetermined time window expires, which can require the DC rejoin the cluster and perform a full synchronization.

DCs receive changes from other DCs in FIFO order. Changes are received over the stream in the order applied at the sender's log. Changes are timestamped using a vector clock that serves to capture causal dependencies. Upon receipt of an change, the change is buffered and only applied when causal dependencies are met. Therefore, within a single session, users observe causal consistency, marked by the combination of monotonic read, monotonic write, read your writes, and writes follow reads. This is also referred to as session consistency.

In some embodiments, as clients are automatically routed to the nearest available DC, clients' consistency guarantees may weaken for two reasons. First, if a client is a device that changes location, e.g., a mobile device, a laptop, a tablet, a notebook computer, a smart watch, smart glasses, etc., a previously accessed DC may no longer be the geographically closest DC during all interactions. Second, if a DC fails, a client may be routed to another DC to ensure availability. Under one or more of these circumstances, clients' guarantees are weakened to eventual consistency. These guarantees are weakened due to the inability to satisfy the following properties: (a) monotonic read: clients may begin a new session at a DC that does not contain previously observed write; (b) read your writes: clients may begin a session and not be able to observe their own writes; (c) monotonic write: clients may begin a new session at a DC that does not contain previous write operations performed by the client at the previous replica; and/or (d) writes follows reads: clients may begin a session at a new DC and write documents based on non-visible reads.

Note that two different clients may be prevented from entering into conflict on the same DC (e.g., a single DC) as one of the clients has to acquire a lock in the DC prior to making the change. This forces parallel client requests to the same DC to become sequential.

Value Convergence

Changes in the system may occur concurrently and therefore the value for a given key may diverge at an individual replica based on the delivery order of concurrent changes—the order they are placed in each DC's event log for the key.

The exemplary document database system provides a mechanism to ensure deterministic value convergence without global coordination.

One mechanism for ensuring deterministic value convergence is based on operation-based CRDTs. The intuition of operation-based CRDTs is as follows: if changes are delivered to each replica in an order that respects the causal order of events and concurrent changes are commutative, then all replicas that receive the same set of changes will arrive at the same value. This is a property that has been formalized as "strong eventual consistency", with CRDTs being one data structure realizing this property.

However, difficulty still remains with the challenge of making inherently non-commutative operations commute. Several examples are provided below.

Registers. Registers, whose only operation is assignment to a value, pose an interesting challenge. While concurrent assignments to the same value do commute, concurrent assignment to two different values do not.

The exemplary document database system may arbitrate the choice between the conflicting changes to select based on the lexicographical sorting of the node identifier in the update, opting for the greatest value based on this ordering of the conflicting changes.

References. References share a similar design to registers. They are registers that are restricted to only contain values that point to other keys in the exemplary system. As the concurrent assignment of registers to different values is non-commutative, the arbitration strategy used for registers must also be used for reference.

Maps. Maps pose an interesting challenge as well. Maps typically provide the ability to add and remove keys, as well as to modify the value of a key. The exemplary document database system can ensure that concurrent modifications to the dictionary commute and ensure that concurrent modifications to each key in the same map commute as well.

Figure 2A:
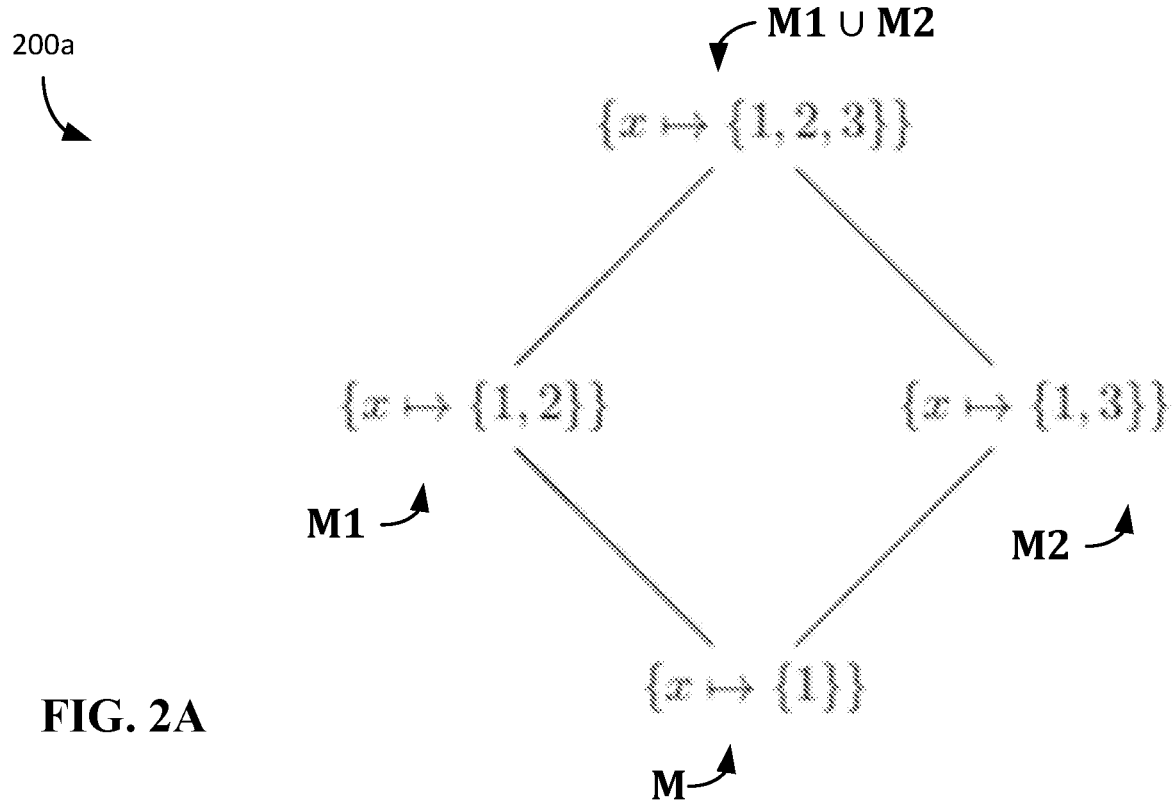
FIGS. 2A-2B are diagrams illustrating value convergence methods for example mappings.

FIG. 2A illustrates an example 200a of a map storing a single set, e.g., map M={x→{1}}. The map M is concurrently modified by adding a value 2 to key x at a first data center DC1 and can be represented as M1={x→{1, 2}}. The map M may be modified by adding a value 3 to key x at DC2 and represented as M2={x→{1, 3}}. In this case, the set union operation produces the same result at each replica for the concurrent operations: M1 ∪ M2={x→{1, 2, 3}}.

Figure 2B:
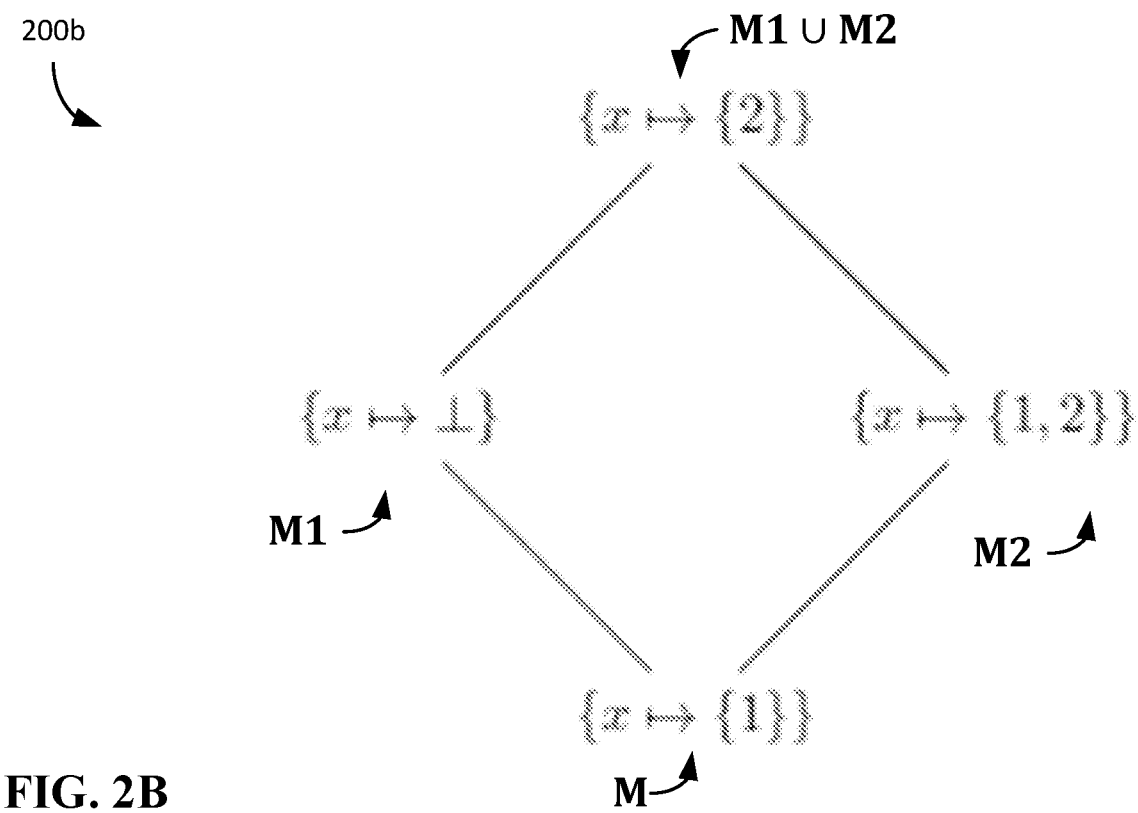

However, a more complicated case may arise under concurrent removals and updates. In the example 200b provided in FIG. 2B, for the same initial map M={x→{1}}, the key x is concurrently removed in DC1 while the value 2 is added to the set stored at key x in DC2.

To determine how the values in the map should converge in example 200b, the exemplary document database system's insertion of new keys are modeled as updates to a perpendicular (⊥) or nullary value, updates for keys can take priority over removals for keys, and removals capture the elements being removed. To realize this in the previous case, the resulting map would resolve at all nodes as M1 ∪ M2={x→{2}}. The removal of the key at a replica removes all contents at time of removal, including the value 1 and the update would add 2 into the set.

As dictionaries in the exemplary document database system are recursive, they may contain other maps, references, sequences, and/or registers. The merge process outlined in this section may be applied recursively throughout the map to achieve value convergence.

The exemplary document database system's dictionaries are recursive, therefore they can contain other dictionaries, as well as registers—using the conflict resolution semantics presented above—and sequences, discussed next.

Figure 3A:
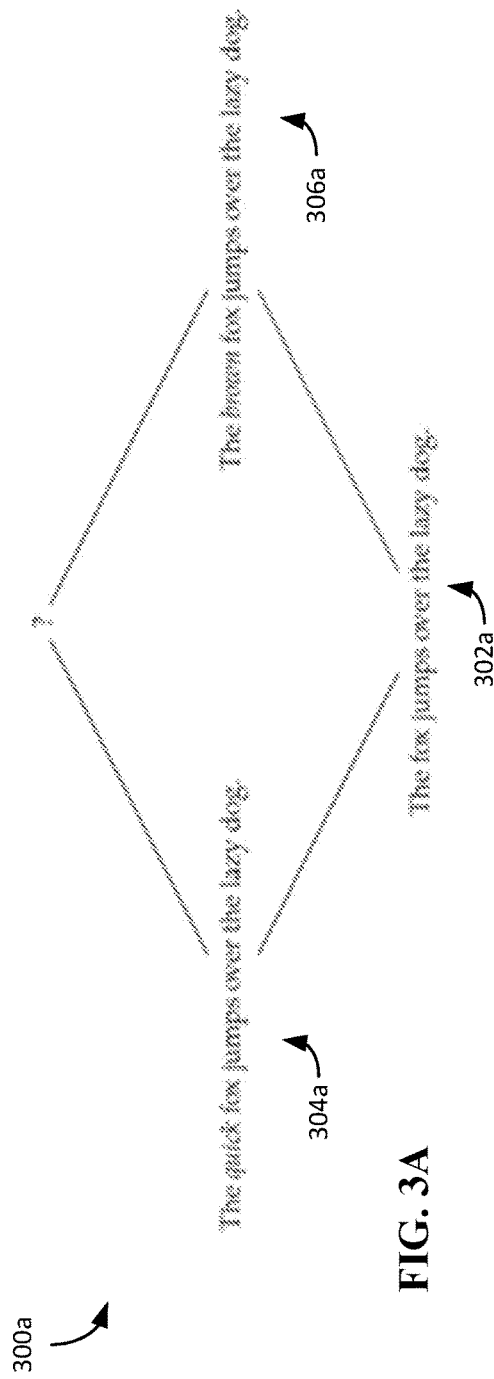
FIGS. 3A-3B are diagrams illustrating value convergence methods for example sequences.
Figure 3B:
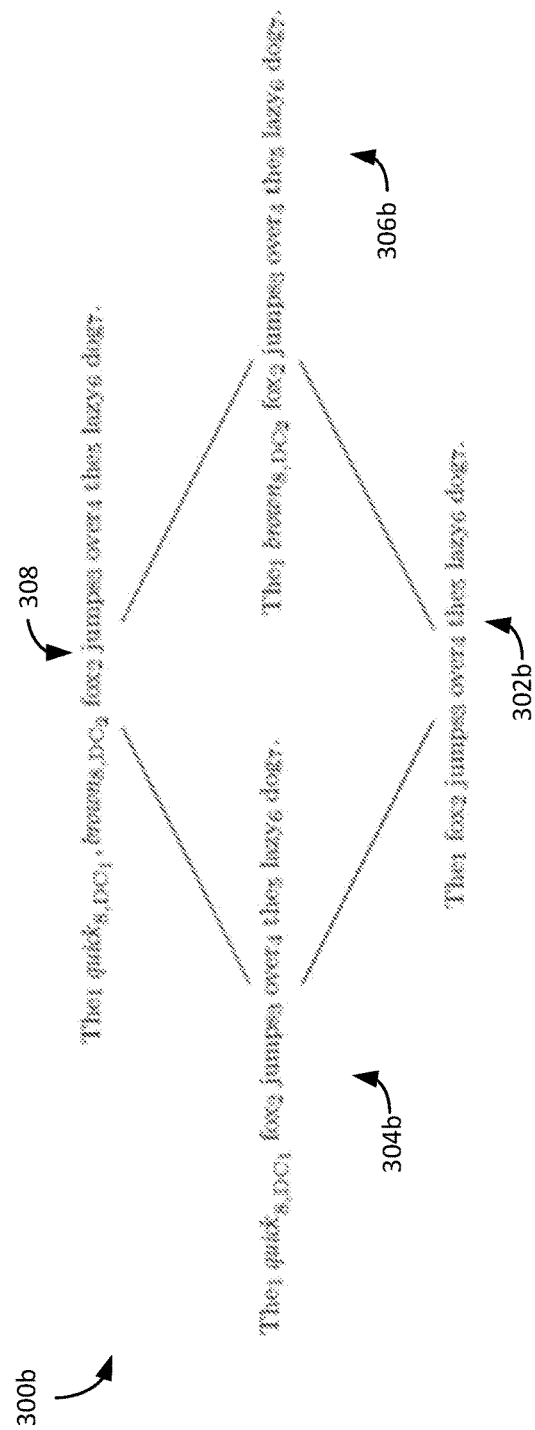

Sequences. Sequences may be challenging as effects of modifying the sequence may not commute. FIGS. 3A-3B illustrate examples 300a, 300b that provide a sequence that is concurrently modified in two or more DCs with the addition of a new word. In this example 300a, the concurrent modification of a sequence 302a occurs where two DCs have concurrently added a word at the same starting position. In the sequence 302a "The fox jumps over the lazy dog", two actors (e.g., users input data into clients, in which each client is connected to a separate DC) concurrently modify the sequence to add the word "quick" (e.g., in sequence 304a at DC1) before "fox" and to add "brown" before "fox" (e.g., in sequence 304b at DC2), respectively. The updates to the same exact cell can be arbitrated to ensure the correct final value.

In the exemplary document database system, the sequence 302b itself is broken up into cells representing each position in the sequence. Each cell is a document reference to another document in the database. The other document is written to as a register and concurrent writes to that cell are resolved using the convergence strategy for the register.

Therefore, the concurrent operation that the exemplary document database system can have is the assignment of document references to positions in the sequence 302b. In that case, lexicographical order on the node identifier of the update is used to arbitrate the concurrent updates. This results in the final sentence 308: "The quick, brown fox jumps over the lazy dog."

This is shown below using the natural numbers as the document reference identifier for simplicity in presentation. In practice, a randomly-generated universally unique identifier (UUID) may be used for the key identifier and concurrent updates are detected using vector clocks.

Transactions

Transactions can enable users to perform operations on groups of documents in the exemplary database. Transactions can be atomic by ensuring that changes, applied against multiple documents in the DC, are applied atomically (e.g., all-or-nothing.)

Isolation Levels

Transactions in the exemplary document database system exhibit a variety of isolation levels, depending on the objects being written to and read from. For transactions accessing shared resources, a wait-die process can be used for deadlock detection and resolution only for transactions executing in the same DC.

For databases operating in single-master mode, transactions are serializable. Transactions can be totally ordered across all replicas. Both read and write locks are explicitly taken at the start of the transaction. Concurrent transactions abort under read-write or write-write conflicts.

For databases operating in multi-master mode, transactions exhibit parallel snapshot isolation. Both read and write locks are taken upon write or specified at the start of the transaction. Transactions are ordered related to the causal order of changes and concurrent transactions are arbitrated using the ordering process outlined above.

Garbage Collection

The event log stored inside each document may grow indefinitely. This is enabled to ensure that at any point, when a new change arrives, the materialized state for the document can be regenerated.

As discussed above, changes are stored as operations modifying a part of a document's state. In the case of primitive types, the change sets the value of a register. In the case of recursive types, an change modifies an individual field (e.g., a specific field in the dictionary).

Since changes to a field are totally ordered (in that changes to documents are causally ordered and a total order is arbitrated using the node identifier of the change), the exemplary document database system needs only to retain the most recent event for a given field. Therefore, in some embodiments, other events (the "garbage") can be collected, removed, and/or deleted.

CRDTs

CRDTs are replicated data types that eventually converge to the same state under concurrent changes. A CRDT instance can be changed without requiring coordination with its replicas. This makes CRDTs highly available for writes.

CRDTs can be classified into state-based CRDTs (e.g., convergent replicated data types (CvRDTs)) and operation-based CRDTs (e.g., commutative replicated data types (CmRDTs)). State-based CRDTs are configured to disseminate states among replicas whereas operation-based CRDTs are designed to disseminate operations.

The exemplary document database system can use operation-based CRDTs (i.e., CmRDTs) in which replicas are guaranteed to converge if operations are disseminated through a reliable causal broadcast (RCB) middleware and/ or if they are configured to be commutative for concurrent operations.

The execution of a CmRDT operation is done in two phases, prepare and merge:
  (1) In the prepare phase, a CmRDT operation is executed on the local replica. The prepare phase reviews the operation and (optionally) the current state and produces a message, representing the operation, which is then disseminated to all replicas; and
  (2) The merge phase applies the disseminated operation at all replicas.

For example, a user may desire to create following JSON document in the exemplary document database system:

```
{
first_name: John,
last_name: Doe,
zipcode: 94087
}
```

From a CRDT perspective, the above includes three (3) operations recorded as immutable events in a log as part of the prepare phase, as follows:

```
<vector_clock, insert, first_name, John>
<vector_clock, insert, last_name, Doe>
<vector_clock, insert, zipcode, 94087>
```

Similarly, any time the user wants to change a field in the document, each change is recorded as an immutable event in the log. For example, if a user wants to change "first_name" field to "Jane", the generated immutable event that needs to be recorded in the log is:
  <vector_clock, update, first_name, Jane>
In other words, any time a change is made to the document, CRDT requires the exemplary document database system to create an immutable event and append to the event log as part of the prepare phase. If the field in the document is changed 100,000 times, the final document still has only 3 fields but the underlying event log will contain 100,003 immutable events.

The size of the document can be proportional to the number of changes made to the document. Because the exemplary database is a geo-replicated database, each location has its own local event log for each document in the database that remains available for writes even if partitioned from other locations.

Events written at one location are asynchronously and reliably replicated to other locations. Then, at the arriving location, the merge phase is applied to each event (to merge with the existing event log at that location for the given document) to derive a converged state deterministically.

The exemplary document database system operates in the merge phase at each location when the event log of each document is pruned.

In various embodiments, the exemplary document database system is configured to:
  1. Prune the event log for each document at each location so that the size of the document does not grow in proportion to number of times the document is changed;
  2. Operates in the merge phase when the event logs are pruned (i.e., collect garbage); and/or
  3. Accomplish the above in a coordination-free manner. In other words, each location does the pruning of its event logs without requiring coordination or synchronization with other locations that are spread around the globe.

The following definitions consider a single log for a single document in the database. For the following example, it is presupposed that all of the attributes in the document will be natural numbers; therefore, nesting of attributes is not considered. It is presupposed that all values assigned to those registers are also natural numbers.

Definitions

A set of nodes N has a strict total order in which no two nodes have the same identifier. N is taken from the natural numbers and is a finite subset of the natural numbers.

$$N=\{n_1,\ldots,n_n\}$$

A vector clock vc can be defined as a map from node identifiers taken from N to a Lamport clock. The vector clock is ordered using the coordinate-wise extension of natural numbers on the Lamport clock.

$$VC=\{n \rightarrow N\} \text{ where } n \in N$$

A type of operation t is a finite set including only those operations executed for updates and removes.

$$T=\{remove, update\}$$

The types of operations are ordered using the following partial order defined on the lattice T.

$$remove \leq_T remove <_T update \leq_T update$$

An operation o is a pair consisting of a type t and a value v. Values range over the natural numbers, where O ranges over all possible operations o.

$$O=\{\langle t,v \rangle \mid t \in T, v \in N\}$$

A change c is a 4-tuple consisting of an attribute a, an operation o, and issuing node n, and a vector clock vc. C ranges over all possible operations c, where attributes range over the natural numbers.

$$C=\{\langle a,o,n,vc \rangle \mid a \in N, o \in O, n \in N, vc \in VC\}$$

A change set cs is a set of changes c. The set of all possible change sets CS is represented by the powerset of changes C.

$$CS = P(C)$$

A change log cl is defined as a set of changes c. The set of all possible change logs CL is taken from the powerset of change sets CS.

$$CL = P(CS)$$

A function attr is defined below to access the attributes of a given change c using the standard projection of the change c.

$$attr(c) = \pi_1(c)$$

A function node is defined below to access the node for a given change c using the standard projection.

$$node(c) = \pi_3(c)$$

A function type is defined below to access the type of change for a given change c using the standard projection on the standard projection of the change c.

$$type(c) = \pi_1(\pi_2(c))$$

Garbage Collection: Concurrent Versions

Figure 4:
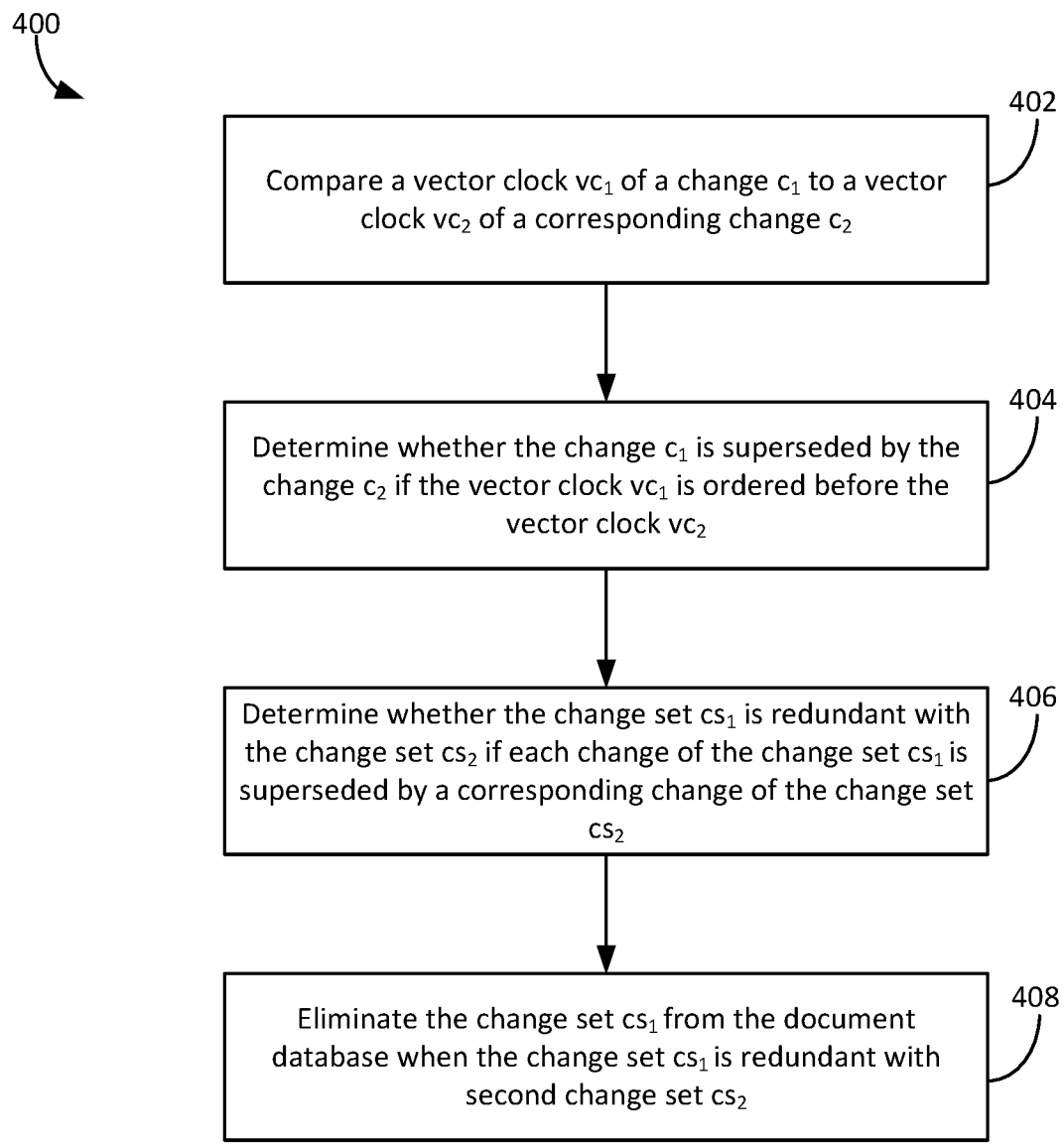
FIG. 4 is a flowchart illustrating an exemplary method for garbage collection in a concurrent version scenario.

The following exemplary garbage collection process considers change operations and keeps all concurrent changes in the change log cl until each change set cs in the change log cl is considered redundant. FIG. 4 is a flowchart illustrating the exemplary garbage collection process 400.

In step 402 of process 400, for a given attribute, the vector clock $vc_1$ of a change $c_1$ (of change set $cs_1$) is compared to a vector clock $vc_2$ of a change $c_2$ (of change set $cs_2$). In step 404 of process 400, the exemplary system may determine that a change $c_1$ is superseded by another change $c_2$ if the changes are for the same attribute and vector clock vc of change $c_1$ is ordered strictly before the associated vector clock vc of change $c_2$.

$$superseded_{cv}(c_1, c_2) = attr(c_1) = attr(c_2) \wedge vc(c_1) < vc(c_2)$$

This step may be executed for each change c of a change set cs. For example, a change set $cs_1$ may include changes $c_{1a}$, $c_{1b}, \ldots c_{1n}$ and a change set $cs_2$ may include $c_{2a}$, $c_{2b}, \ldots c_{2n}$. Each change c is associated with a vector clock vc, as follows:

TABLE 1

Comparison of change set $cs_1$ to change set $cs_2$ for the exemplary garbage collection method.

| Change set $cs_1$ | | Change set $cs_2$ | |
|---|---|---|---|
| Changes $c_1$ | Vector clocks $vc_1$ | Changes $c_2$ | Vector clocks $vc_2$ |
| $c_{1a}$ | $vc_{1a}$ | $c_{2a}$ | $vc_{2a}$ |
| $c_{1b}$ | $vc_{1b}$ | $c_{2b}$ | $vc_{2b}$ |
| ... | ... | ... | ... |
| $c_{1n}$ | $vc_{1n}$ | $c_{2n}$ | $vc_{2n}$ |

Accordingly, a change set $cs_1$ may be superseded by a change set $cs_2$ if the respective vector clocks $vc_1$ of each change $c_1$ is ordered before the corresponding ones of the respective vector clocks $vc_2$ of each change $c_2$.

In step 406, the exemplary system may determine that a change set cs is redundant with respect to a change log cl if, for each change in the change set cs (e.g., change set $cs_1$), there exists a change in another change set cs' (e.g., change set $cs_2$) taken from the change log cl that supersedes those changes.

$$redundant_{cv}(cs, cl) = \forall c \in cs,$$
$$\exists c' \in cs' | cs' \in cl \wedge superseded_{cv}(c, c')$$

In step 408, the exemplary system may eliminate (e.g., archive, remove, permanently delete, etc.) the change set $cs_1$ from the document database if redundant with change set $cs_2$.

In some embodiments, documents with a single attribute may include as many as N non-redundant change sets cs, where N is the number of nodes in the cluster. For example, a DC can include a cluster of N nodes starting with an empty document. If all nodes cannot directly communicate with any of the other nodes, and if each node generates a change to the attribute of the document before it can communicate that change to any of the other nodes, then none of the changes can supersede any of the other changes. Therefore, if none of the changes are superseded by any of the other changes, none of the change sets cs will be considered redundant.

In some embodiments, documents with M attributes may include as many as N non-redundant change sets cs for each attribute, where N is the number of nodes in the cluster.

Lexicographical Sorting

Figure 5:
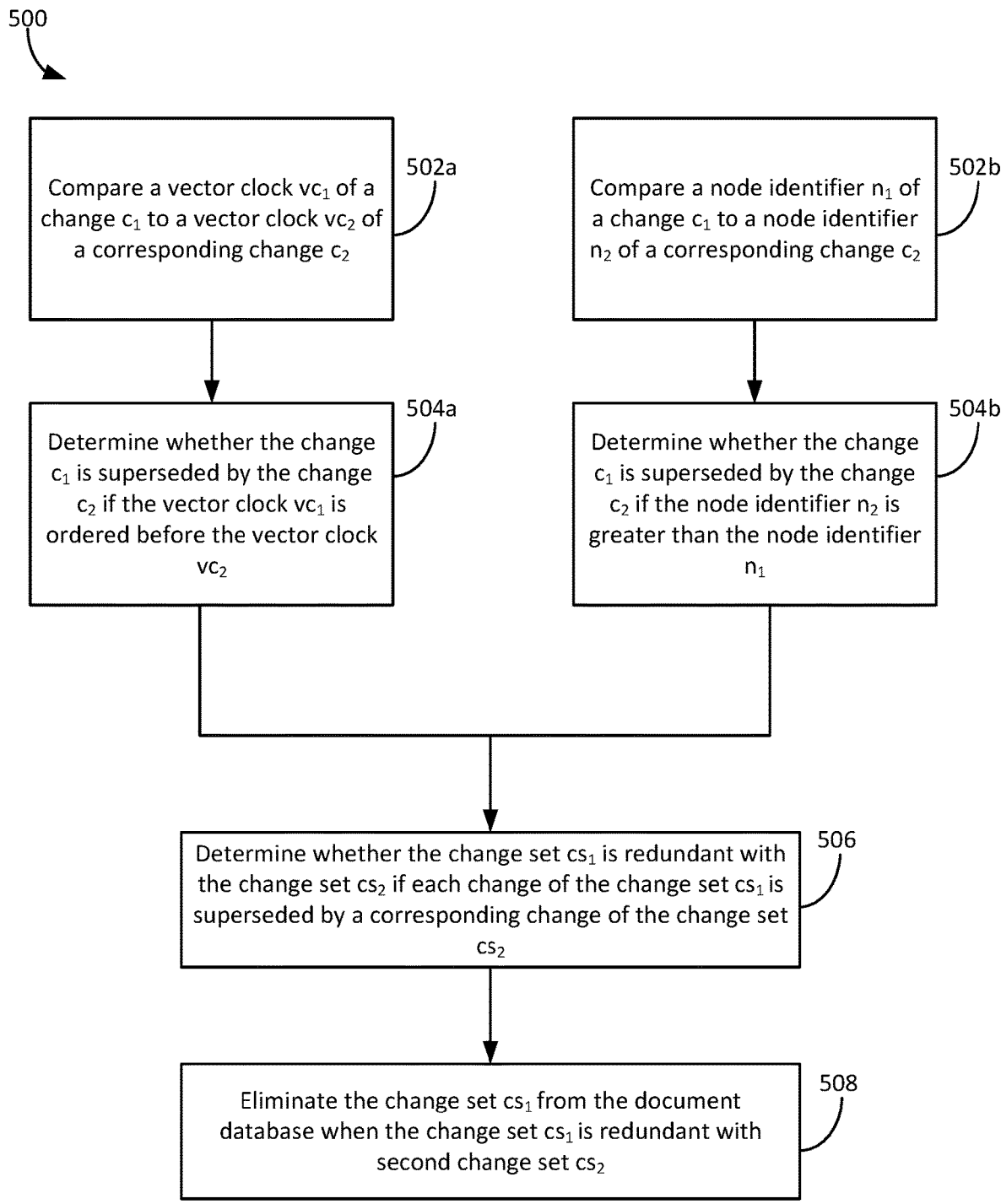
FIG. 5 is a flowchart illustrating an exemplary method for garbage collection including lexicographical sorting.

In some embodiments, the exemplary process considers update operations and keeps all concurrent changes in the change log cl until each change set cs in the change log cs is considered redundant. However, in this version, the system retains the concurrent update with the greatest node identifier. Note that, in this exemplary embodiment, removes are not considered in lexicographical sorting. FIG. 5 is a flowchart illustrating the garbage collection process 500 which may leverage lexicographical sorting.

In step 502a of process 500, for a given attribute, the vector clock $vc_1$ of a change $c_1$ is compared to a vector clock $vc_2$ of a change $c_2$. In step 504a of process 500, the exemplary system may determine that a change $c_1$ is superseded by another change $c_2$ if the changes are for the same attribute and change $c_1$'s associated vector clock vc is ordered strictly before the change $c_2$'s associated vector clock.

Alternatively, in step 502b, the node identifier of the change $c_1$ is compared to the node identifier of change $c_2$. In step 504b, the exemplary system may determine that the change $c_1$ is superseded by change $c_2$ if the changes $c_1$ and $c_2$ are concurrent, but the node identifier for the change $c_2$ is strictly greater. The following expression summarizes the superseding logic described herein:

$$superseded_{ls}(c_1, c_2) = \{true \ attr(c_1) = attr(c_2) \wedge vc(c_1) <$$
$$vc(c_2) \ false \ attr(c_1)$$
$$= attr(c_2) \wedge vc(c_1) > vc(c_2) \ node(c_2) >$$
$$node(c_1) \ attr(c_1)$$
$$= attr(c_2) \wedge vc(c_1) \not< vc(c_2) \wedge vc(c_2) \not< vc(c_1)$$

As detailed above for example step 404, steps 502a and 504a (alternatively, steps 502b and 504b) may be executed for each change c of a change set cs.

In step 506, the exemplary system may determine that a change set cs is redundant with respect to a change log cl if, for all changes in the change set cs, there exists a change c' in another change set cs' taken from the change log cl that supersedes the change c.

$$\text{redundant}_{ls}(cs,cl) = \forall c \in cs, \exists c' \in cs' | cs' \in cl \land \text{superseded}_{ls}(c,c')$$

In step 508, the exemplary system may eliminate (e.g., archive, remove, permanently delete, etc.) the change set $cs_1$ from the document database if redundant with change set $cs_2$.

Lexicographical Sorting—Minimality of Garbage Collection

In some embodiments, documents with a single attribute may include only a single non-redundant change set cs.

For example, a DC can include a cluster of N nodes starting with an empty document. If, for some time, all nodes cannot directly communicate with any of the other nodes, and if each node generates a change to that attribute before it can communicate that change to any of the other nodes, then none of the changes can supersede any of the other changes. Given that each node has a unique node identifier, one of the changes must supersede the other. Therefore, if, for every pair of change sets cs, one of the change sets cs must supersede the other, then transitively only a single change set cs will be non-redundant.

Documents with M attributes may include as many as M non-redundant change sets cs.

Update Over Remove Prioritization

Figure 6:
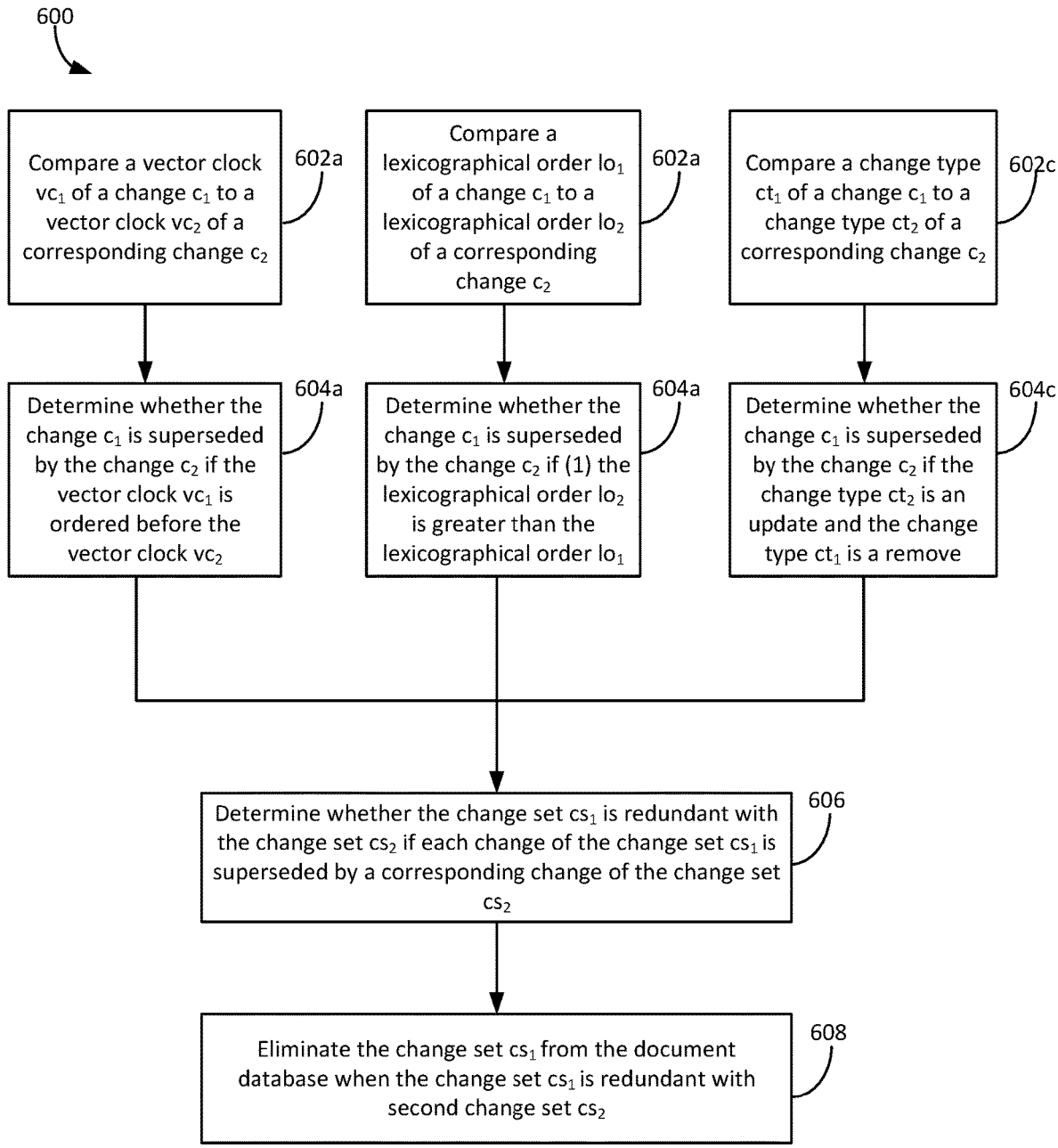
FIG. 6 is a flowchart illustrating an exemplary method for garbage collection including prioritization of updates over removes.

The exemplary garbage collection process may arbitrate on concurrent updates using the lexicographically greatest node identifier, and/or may consider updates where updates should supersede removes. FIG. 6 is a flowchart illustrating the garbage collection process 600 which may leverage prioritization of updates over removes.

In step 602*a* of process 600, for a given attribute, the vector clock $vc_1$ of a change $c_1$ is compared to a vector clock $vc_2$ of a change $c_2$. In step 604*a* of process 600, the exemplary system may determine that a change $c_1$ may be superseded by another change $c_2$ if the changes are for the same attribute but change $c_1$'s associated vector clock vc is ordered strictly before change $c_2$'s associated vector clock vc.

Alternatively, in step 602*b*, the lexicographical order of the change c1 is compared to the lexicographical order of change c2. In step 604*b*, the exemplary system may determine that the change $c_1$ may be superseded by change $c_2$ if the changes are concurrent and the update with the greatest lexicographical order is preferred when both types of change are updates. Alternatively, in step 602*c*, the system is configured to compare the change type of change c1 to the change type of change c2. In step 604*c*, the system may determine that the change cl may be superseded by change c2 if the change type of change c1 is a remove and the change type of change c2 is an update, as updates are preferred over removals.

$$\text{superseded}_{ur}(c_1,c_2) = \{\text{true attr}(c_1) = \text{attr}(c_2) \land vc(c_1) < vc(c_2) \text{false attr}(c_1) = \text{attr}(c_2) \land vc(c_1) > vc(c_2) \text{type}(c_2) > T\text{type}(c_1)\text{attr}(c_1) = \text{attr}(c_2) \land vc(c_1) \not< vc(c_2) \land vc(c_2) \not< vc(c_1) \land \text{type}(c_1) \neq \text{type}(c_2) \text{node}(c_2) > \text{node}(c_1)\text{attr}(c_1) = \text{attr}(c_2) \land vc(c_1) \not< vc(c_2) \land vc(c_2) \not< vc(c_1) \land \text{type}(c_1) \neq \text{type}(c_2)$$

As detailed above for example step 404, steps 602*a* and 604*a* (alternatively, steps 602*b* and 604*b*) may be executed for each change c of a change set cs.

In step 606, the exemplary system may determine that a change set cs is redundant with respect to a change log cl if, for all changes in the change set cs, there exists a change c' in another change set cs' taken from the change log cl that supersedes the change c.

$$\text{redundant}_{ur}(cs,cl) = \forall c \in cs, \exists c' \in cs' | cs' \in cl \land \text{superseded}_{ur}(c,c')$$

In step 608, the exemplary system may eliminate (e.g., archive, remove, permanently delete, etc.) the change set $cs_1$ from the document database if redundant with change set $cs_2$.

Update Over Remove Prioritization—Minimality of Garbage Collection

In some embodiments, documents with a single attribute may include only a single non-redundant change set if all of the types of operations performed are updates.

For example, a DC can include a cluster of N nodes starting with a document with a single attribute set to 1. If all nodes cannot directly communicate with any of the other nodes, and if each node generates an update to that attribute before it can communicate that change to any of the other nodes, then none of the changes can supersede any of the other changes. Given that each node has a unique node identifier, one of the changes can supersede the other based on the node identifier. Therefore, if, for every pair of change sets, one of the change sets must supersede the other, then transitively only a single change set will be non-redundant.

In some embodiments, documents with a single attribute may include only a single non-redundant change set if the types of operations performed are updates with a single removal by the first node.

For example, a DC can include a cluster of N nodes starting with a document with a single attribute set to 1. If (i) all nodes cannot directly communicate with any of the other nodes, (ii) each node generates an update to that attribute, and (iii) the first node removes that attribute, then before any of the nodes can communicate with any other nodes none of the changes can supersede any of the other changes. Given that updates override removals, and that each node has a unique node identifier that can supersede any other nodes based on removals, transitively only a single change set will be non-redundant.

In some embodiments, documents with a single attribute may include only a single non-redundant change set if the types of operations performed are removes with a single update by the first node.

For example, a DC can include a cluster of N nodes starting with a document with a single attribute set to 1. If (i) all nodes cannot directly communicate with any of the other nodes, (ii) each node generates a remove for that attribute, and (iii) the first node updates that attribute, then before any of the nodes can communicate with any other nodes none of the changes can supersede any of the other changes. Given that updates override removals, and that each node has a unique node identifier that can supersede any other nodes based on removals (by Lemma 4.1), transitively, only a single change set will be non-redundant.

Documents with M attributes may include as many as M non-redundant change sets.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 7:
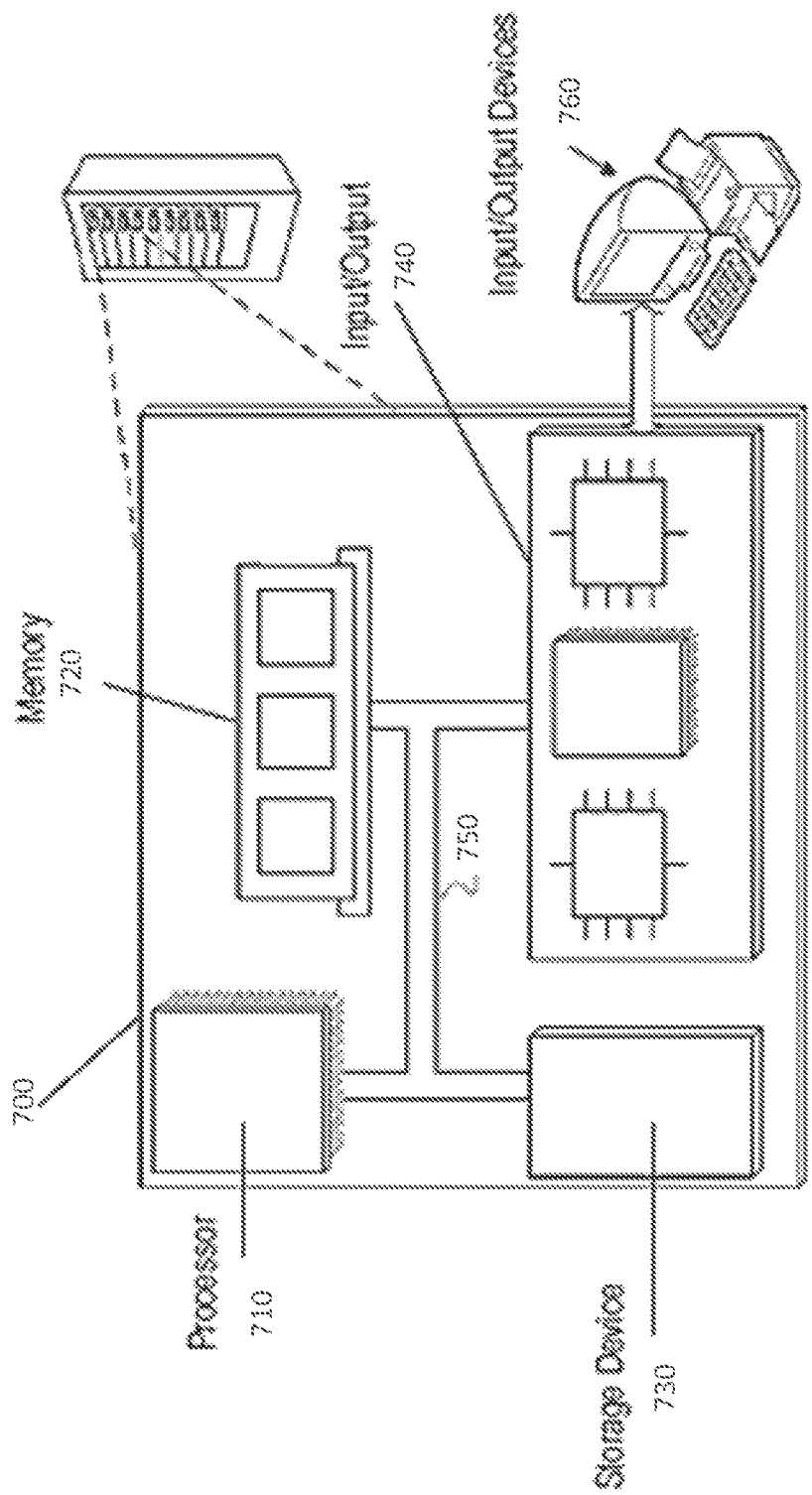
FIG. 7 is a diagram of an example computer system that may be used in implementing the systems and methods described herein.

FIG. 7 is a block diagram of an example computer system 700 that may be used in implementing the technology described in this document. General-purpose computers, network appliances, mobile devices, or other electronic systems may also include at least portions of the system 700. The system 700 includes a processor 710, a memory 720, a storage device 730, and an input/output device 740. Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 730 may be implemented in a distributed way over a network, such as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A system for garbage deletion in a document database, the system comprising:
   at least one memory for storing computer-executable instructions; and
   at least one processor for executing the instructions stored on the memory, wherein execution of the instructions programs the at least one processor to perform operations comprising:
   for each change in a first change set:
      comparing a first characteristic of the change to a second characteristic of a corresponding change in a second change set, wherein the first characteristic is a first node identifier, first lexicographical order or first change type and the second characteristic is a second node identifier, second lexicographical order or second change type, and wherein the change of the first change set and the change of the second change set pertain to an attribute of a document in the document database;
      determining that the change of the first change set is superseded by the change of the second change set when (i) the second node identifier is greater than the first node identifier, (ii) the second lexicographical order is greater than the first lexicographical order, or (iii) the second change type is an update and the first change type is a remove;
   determining that the first change set is redundant with the second change set when each change of the first change set is superseded by a corresponding change of the second change set; and
   eliminating the first change set from the document database after determining that the first change set is redundant with second change set.

2. The system of claim 1, wherein the change of the first change set and the change of the second change set are updates to the document when the first characteristic is the first node identifier and the second characteristic is the second node identifier.

3. The system of claim 1, wherein the operations are executed for a plurality of document attributes including the attribute.

4. The system of claim 1, wherein the first change is concurrent with the second change.

5. The system of claim 1, wherein the document database is configured to operate over a plurality of data centers.

6. The system of claim 5, wherein the data centers are configured to each replicate the document database.

7. A computer-implemented method for garbage deletion in a document database, the method comprising:
   for each change in a first change set:
      comparing a first characteristic of the change to a second characteristic of a corresponding change in a second change set, wherein the first characteristic is a first node identifier, first lexicographical order or first change type and the second characteristic is a second node identifier, second lexicographical order or second change type, and wherein the change of the first change set and the change of the second change set pertain to an attribute of a document in the document database;
      determining that the change of the first change set is superseded by the change of the second change set when (i) the second node identifier is greater than the first node identifier, (ii) the second lexicographical order is greater than the first lexicographical order, or (iii) the second change type is an update and the first change type is a remove;
   determining that the first change set is redundant with the second change set when each change of the first change set is superseded by a corresponding change of the second change set; and
   eliminating the first change set from the document database after determining that the first change set is redundant with second change set.

8. The method of claim 7, wherein the change of the first change set and the change of the second change set are updates to the document when the first characteristic is the first node identifier and the second characteristic is the second node identifier.

9. The method of claim 7, wherein the method is executed for a plurality of document attributes including the attribute.

10. The method of claim 7, wherein the first change is concurrent with the second change.

11. The method of claim 7, wherein the document database is configured to operate over a plurality of data centers.

12. The method of claim 11, wherein the data centers are configured to each replicate the document database.

13. A non-transitory computer-readable medium having instructions stored thereon that, when executed by one or more computer processors, cause the computer processors to perform operations comprising:
for each change in a first change set:
  comparing a first characteristic of the change to a second characteristic of a corresponding change in a second change set, wherein the first characteristic is a first node identifier, first lexicographical order or first change type and the second characteristic is a second node identifier, second lexicographical order or second change type, and wherein the change of the first change set and the change of the second change set pertain to an attribute of a document in the document database;
  determining that the change of the first change set is superseded by the change of the second change set when (i) the second node identifier is greater than the first node identifier, (ii) the second lexicographical order is greater than the first lexicographical order, or (iii) the second change type is an update and the first change type is a remove;
determining that the first change set is redundant with the second change set when each change of the first change set is superseded by a corresponding change of the second change set; and
eliminating the first change set from the document database after determining that the first change set is redundant with second change set.

* * * * *